United States Patent

[11] 3,612,563

| [72] | Inventor | Eugene A. Kazmark, Sr.<br>5 Remin Lane, Joliet, Ill. 60433 |
|---|---|---|
| [21] | Appl. No. | 9,147 |
| [22] | Filed | Feb. 6, 1970 |
| [45] | Patented | Oct. 12, 1971<br>Continuation-in-part of application Ser. No. 685,072, Nov. 22, 1967, now abandoned. |

[54] COLLAPSIBLE SUITCASE CARRIER
2 Claims, 10 Drawing Figs.
[52] U.S. Cl. .................................................. 280/36 C,
280/47.24, 280/47.37, 280/79.1
[51] Int. Cl. ...................................................... B62b 1/12
[50] Field of Search........................................... 280/34, 35,
36 CR, 47.13, 79.1, 47.17, 47.24, 179.1; 214/374;
287/58 CT

[56] References Cited
UNITED STATES PATENTS
2,838,320   6/1958   Sosalla ..........................   280/47.24

3,173,646   3/1965   Gray ............................   280/179
FOREIGN PATENTS
1,301,349   7/1961   France ..........................   280/47.24

*Primary Examiner*—Leo Friaglia
*Assistant Examiner*—Robert R. Song
*Attorney*—Dawson, Tilton, Fallon & Lungmus ABSTRACT: A collapsible suitcase carrier for transporting suitcases and the like. The carrier is provided with a dolly which includes an elongated L-shaped supporting bracket provided with a pair of wheels. An elongated handle is removably attached to the dolly, and the handle may be formed in sections which may be taken apart or telescoped to reduce the length of the handle to a compact size. The carrier also includes a strap, both ends of which are attached to the dolly. The supporting bracket is adapted to receive an edge of the suitcase to be carried, and the suitcase is further supported by the handle. The suitcase is firmly held against the supporting bracket and handle by passing the strap around the suitcase and securing the strap to the handle.

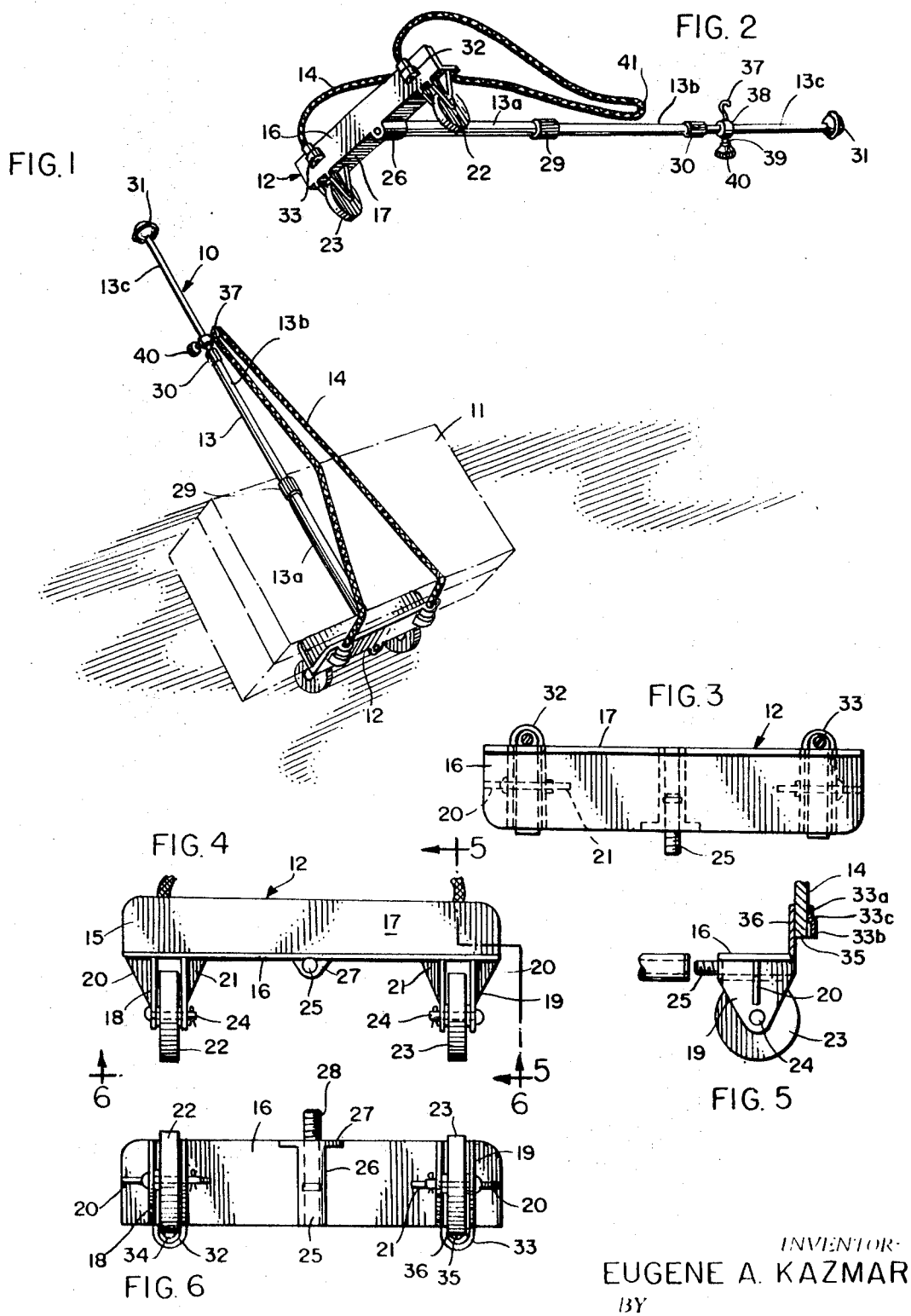

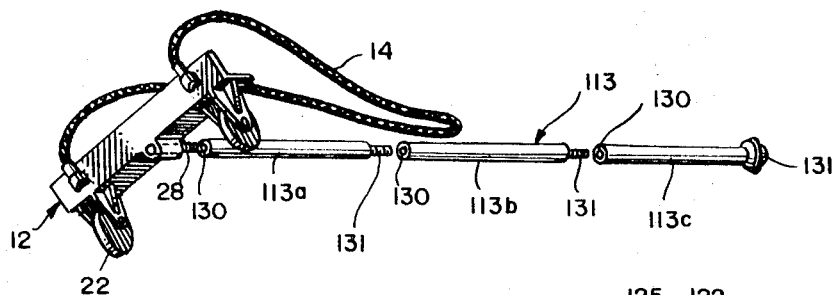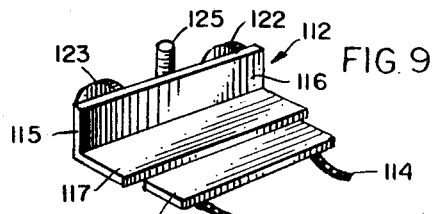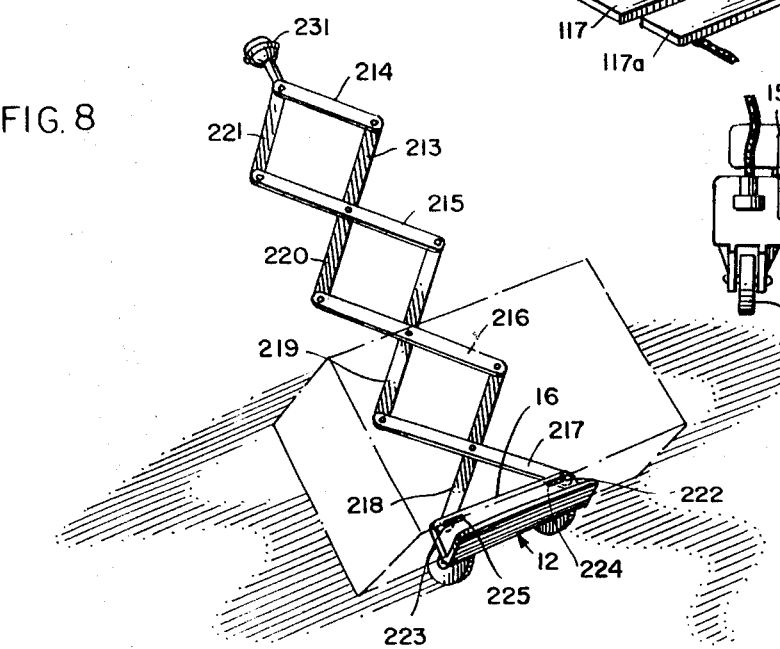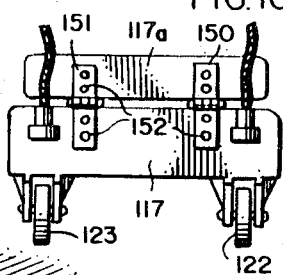

COLLAPSIBLE SUITCASE CARRIER

RELATED APPLICATION

This application is a continuation-in-part of my prior copending application entitled "Collapsible Suitcase Carrier," Ser. No. 685,072, filed Nov. 22, 1967, now abandoned.

BACKGROUND OF THE INVENTION

This invention relates to a suitcase or luggage carrier, and, more particularly, to a compact collapsible carrier which may be quickly and easily assembled to transport a suitcase from place to place in a secure manner and quickly and easily disassembled when the suitcase has reached its destination.

Luggage carriers have been provided in the past, but these carriers have suffered from several disadvantages. Some carriers are custom made for a particular piece of luggage and can be used only with that piece and no other. Other carriers may perhaps be more universal, but this feature is frequently gained at the expense of a safe, secure mounting for all suitcases. Still other carriers, in order to provide a secure hold on the suitcases, are provided with elaborate locking means which interfere with the facility with which the suitcase may be mounted and dismounted from the carrier.

Another difficulty with many carriers is that they are rather bulky and are bothersome to carry when not in use. It will be appreciated that these carriers are particularly advantageous for a person who is traveling on some form of public transportation. For example, a plane passenger might prefer to carry his suitcase onto the plane rather than checking it at the baggage counter. However, if a passenger is old or in ill health, he may find that this is difficult to do because of the distance he must travel in most modern air terminals before boarding the plane. Conventional suitcase carriers cannot be used because these create additional bulk in the airplane cabin. It is desirable, therefore, to provide a suitcase carrier which may be used to transport luggage, and which may be quickly and easily disassembled into a compact form and even inserted within the luggage itself when it is no longer needed.

SUMMARY OF THE INVENTION

The inventive suitcase carrier may be carried in a compact, disassembled form within the suitcase to be carried or in a separate carrying case. When the carrier is to be used, it may be quickly and easily assembled, and may carry almost any suitcase in a secure manner.

DESCRIPTION OF THE DRAWING

FIG. 1 is a perspective view of the inventive suitcase carrier with a suitcase illustrated in phantom;

FIG. 2 is a perspective view of the suitcase carrier from another angle;

FIG. 3 is a fragmentary top plan view of the carrier with the handle removed;

FIG. 4 is a front elevational view of the carrier of FIG. 3;

FIG. 5 is a side elevational view taken along the line 5—5 of FIG. 4;

FIG. 6 is a bottom plan view taken along the line 6—6 of FIG. 4;

FIG. 7 is an exploded perspective view showing an alternative embodiment of the handle;

FIG. 8 is a perspective showing still another embodiment of the handle;

FIG. 9 is a perspective view of a modified dolly assembly; and

FIG. 10 is a bottom plan view of the dolly assembly of FIG. 9.

DESCRIPTION OF SPECIFIC EMBODIMENT

Referring to FIG. 1, the numeral 10 designates generally a suitcase carrier for transporting a suitcase shown in phantom outline in FIG. 1 and designated by the numeral 11. As used herein the term "suitcase" is not meant to be limited to a case for carrying clothes, but is meant to include all types of luggage, boxes, and the like. The suitcase carrier 10 is seen to include a dolly assembly 12, an elongated handle 13, and a strap 14 for holding the suitcase 11 against the dolly assembly and the handle.

As can be seen best in FIG. 4, the dolly assembly 12 includes an elongated generally L-shaped support bracket 15 which provides a pair of generally planar sides 16 and 17 extending generally perpendicular with respect to each other. A pair of depending, generally U-shaped wheel-mounting brackets 18 and 19 extend downwardly from side 16 adjacent the ends of the support bracket and may be reinforced by pairs of triangular braces 20 and 21. Wheels 22 and 23 are journaled within the wheel-mounting brackets 18 and 19 by means of pins 24. The wheels 22 and 23 may be solid rubber or rubber trimmed, or may include other appropriate sound-deadening material.

Referring to FIGS. 3 and 6, rod 25 extends generally transversely of bracket side 16 and is secured within a tubular sleeve 26 on the lower surface of bracket side 16. The support bracket 15, wheel brackets 18 and 19, and sleeve 26 may advantageously be made integrally from molded plastic, and the forward end of the sleeve 26 may be reinforced by a triangular brace 27. Rod 25 may advantageously be made of rod stock and machined to provide a threaded end 28.

Referring now to FIGS. 1 and 2, the handle 13 is formed of a plurality of telescopingly engaged cylindrical sections 13a, 13b, and 13c. One end of the hollow section 13a is internally threaded for engagement with the threaded roll 25, and the other end is externally threaded for engagement with a collar 29. The collar 29 encloses an interrupted plastic ring which is slidably received on the handle section 13b. The ring may be drawn against the end of the section 13a and tightened about the section 13b as the collar 29 is screwed onto the threaded end of section 13a, thereby locking the handle sections in the desired position. Since this type of locking means for telescoping members is well known, it is believed unnecessary to set forth a more particular description. Similarly, section 13b is threadedly engaged with a collar 30 which encloses an interrupted ring for locking the sections 13b and 13c. A gripping knob 31 is screwed or otherwise secured to the outer end of the handle section 13c to facilitate pulling the suitcase carrier.

The support bracket 15 includes a pair of generally semicylindrical sleeves 32 and 33 molded integrally on the outer surface of bracket side 17, and each of the ends 34 and 35 (FIG. 6) of the strap is received by one of the sleeves 32 and 33. As can be seen best in FIG. 5, the sleeve 33 includes a relatively narrow portion 33a having a diameter approximately the same as that of the strap 14 and a radially enlarged portion 33b which provides an annular shoulder 33c. After the strap end is passed through the narrow portion 33a, a staple 36 or other retaining device can be passed through the strap for engaging the shoulder 33c and for preventing withdrawal of the strap. The strap end 34 is similarly secured within sleeve 32.

The middle portion of the looped strap 14 is adapted to be passed over and held by hook 37 which is threadedly secured to collar 38 (FIGS. 1 and 2). The collar is slidably carried by handle section 13c and may be selectively locked in place along the length thereof by set screw 39 which is provided with a gripping knob 40. The set screw is threadedly received by a bore in the collar and may be tightened against the handle section 13c.

Until the suitcase carrier 10 is to be used, the handle 13 may be disengaged from the support bracket 15, and the handle sections 13a–13c may be telescoped so that the carrier may be conveniently stored in the suitcase 11 or in its own carrying bag. When the suitcase 11 is to be transported by the suitcase carrier, the carrier is removed from the suitcase, and is screwed onto the rod 25 of the dolly assembly. The handle is extended for the desired length, and the sections are locked relative to each other by the locking collars 29 and 30. The suitcase 11 may then be positioned so that one of the edges formed by intersecting sides of the suitcase is received by support bracket 15 and the suitcase sides engage bracket sides 16 and 17. The L-shape of the support bracket adapts the bracket for receiving almost any type of article which has generally planar sides which are generally normal to each other. Once the suitcase is received by the support bracket 15, the strap 14 is passed around the suitcase and the looped middle portion 41 of the strap is pulled over the hook 37. If desired, the strap may be tightened about the suitcase by pulling the collar 38 towards the knob 31 and then retightening the set screw 39.

My suitcase carrier can be made extremely light in weight by forming the dolly of plastic and handle of aluminum or other lightweight material. However, even though the carrier may be very light, the suitcase is firmly held in place by the cooperation between the strap, support bracket, and handle.

The suitcase carrier 10 may be used with a number of different sized suitcases, and, although in the particular illustration shown the suitcase is mounted with its long dimension transverse to the handle 13, this dimension may extend parallel with the handle if desired in relatively narrow or crowded locations. Also, I have found that it is desirable to make the strap of a material having some elasticity in order to provide a tighter and more secure grip on the suitcase, and the elasticity of the strap further increases the capability of the carrier to be used with larger suitcases.

Rather than passing the strap over the hook 37, the strap could also be passed over handle before it is fully extended, as explained more fully in my said prior application, U.S. Pat. Ser. No. 685,072. Alternatively, the suitcase may be inserted on the support bracket, the strap passed around the suitcase, and the complete handle then inserted through the looped middle portion 41 of the strap and secured to the dolly assembly.

When the suitcase has been transported to its destination, it may readily be removed from the carrier merely by pulling the elastic strap over the hook 37. Alternatively, the set screw 39 could be loosened to permit the hook to slide toward the base.

A modified handle 113 is shown in FIG. 7 which is made up of a number of sections 113a, 113b, and 113c, which may be made of rod stock. One end of each handle section 113a–113c is counterbored and internally threaded as at 130, and the other end of sections 113a and 113b is threaded as at 131. The handle 113 may be quickly assembled into a single length by threadedly engaging the section ends 131 with the counter bores 130, and the handle may be readily attached to the dolly assembly 12 by screwing handle section 112a onto the threaded projection 28. The handle sections can be made interchangeable by providing the threaded ends 129 and 131 with the same size threads. A gripping knob 131 is attached to one end of the handle to facilitate pulling the suitcase carrier. The strap 14 may be secured either by providing the handle 113 with a hook similar to hook 37 or by passing the strap over the end of one of the handle sections.

Still another type of extendible handle is shown in FIG. 8. Handle 213 is formed of crisscrossing and pivotally connected slots which may be extended as shown in FIG. 8 or pushed toward dolly assembly 12 to collapse the handle. This type of extendible arm construction is well known, and it is sufficient to say that slots 214, 215, 216 and 217 extend generally parallel to each other and are pivotally connected to parallel slots 218, 219, 220 and 221, which each of slots 215–220 are pivotally connected to three other slots at the opposite ends and at the midpoint thereof, and slots 214 and 221 are pivotally connected to each other and to slots 220 and 215, respectively.

The ends of slots 217 and 218 are slidably secured, as by pins 222 and 223, in slots 224 and 225 in bracket side 16 of the dolly assembly to permit the ends of slots 212 and 218 to move toward and away from each other as the handle is extended and collapsed, respectively.

A knob 231 is attached to the end of the handle, and the elastic strap (not shown) can be pulled around the suitcase and over the knob 231 or secured to a suitable hook attached to the handle.

A modified dolly assembly 12' is shown in FIGS. 9 and 10. The dolly 112 is identical to the dolly 12 but further includes an extension panel 117a for adapting the dolly assembly to hold suitcases having relatively wide bases or bases which are rounded and have no corner which can be inserted into the corner formed by the L-shaped bracket 115. The panel is hingedly secured to the bracket side 117 by hinges 150 and 151, which are attached to the lower surfaces of bracket side 117 and panel 117a by screws 152, and the hinges are constructed and arranged to permit the panel 117a to swing into overlying relationship to the upper surface of bracket side 117 when the panel is not needed or when the suitcase carrier is to be stored. When the panel overlies the bracket side, the suitcase will be supported by the lower surface of the panel as viewed in FIG. 9. Preferably, the panel 117a is provided with recesses for receiving the hinges so that when the panel is overlying the bracket side 117, the hinges are flush with the surface of the panel and the suitcase will be supported by a flat surface. The dolly 112 similarly includes bracket side 116 and wheels 122 and 123.

When the panel 117a is extended as shown in FIGS. 9 and 10, the hinges 150 and 151 will maintain the panel generally coplanar with the bracket side 117, and the strap 114 will extend below the panel, around the suitcase, to the handle.

While in the foregoing specification, I have set forth a detailed description of an embodiment of my invention for the purpose of illustration, it is to be understood that many of the details herein given may be varied considerably by those skilled in the art without departing from the spirit and scope of my invention.

I claim:

1. A suitcase carrier including an elongated support bracket, and said support bracket being generally L-shaped in transverse cross section and providing a pair of generally planar sides adapted to engage adjacent sides of a suitcase, a rod secured to one of said bracket sides and extending generally transversely thereof, an elongated handle detachably secured to the rod, a hook slidably carried by the handle, means for selectively securing the hook at a desired location along the length of the handle, a wheel-mounting bracket extending from the support bracket adjacent each end thereof, a wheel journaled in each wheel-mounting bracket, and an elongated relatively elastic strap, one end of the strap being attached to the support bracket adjacent one end thereof and the other end of the strap being attached to the support bracket adjacent the other end thereof whereby said strap may extend from adjacent the ends of the support bracket and around a suitcase to said hook for holding the suitcase against the bracket side and said handle, said handle being formed of a plurality of telescopingly joined sections and being disengageable from said rod whereby the length of said handle may be varied and said suitcase carrier may be carried in a compact manner.

2. The suitcase carrier of claim 1, including a panel hingedly secured to the other of the planar sides of the support bracket, said panel being movable between a first position in which the panel extends generally coplanar to the said other bracket side and a second position in which the panel extends in generally overlying relationship with the other bracket side.